Nov. 16, 1954  H. W. NIEMAN  2,694,313
BRUSH THERMOCOUPLE TEMPERATURE MEASURING APPARATUS
Filed Sept. 2, 1950  2 Sheets-Sheet 1
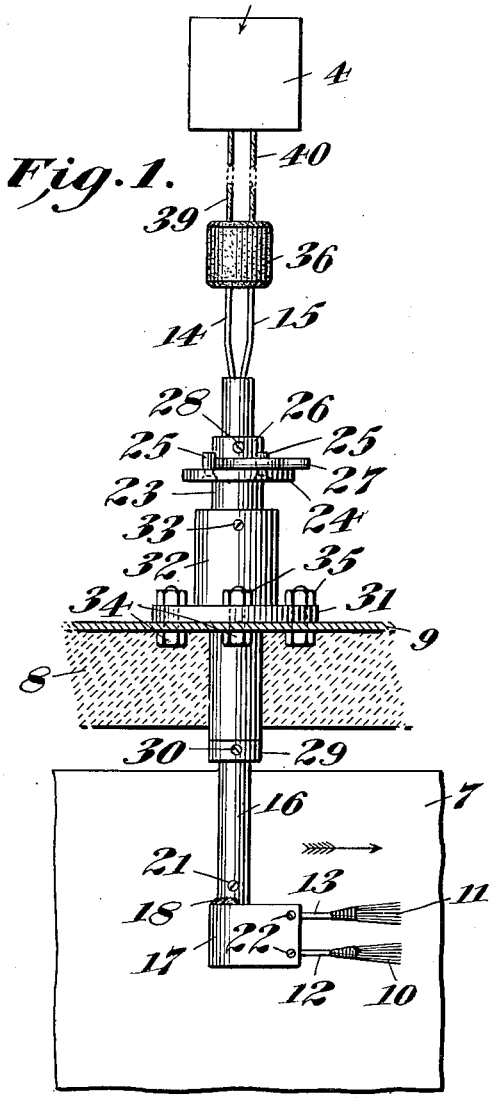
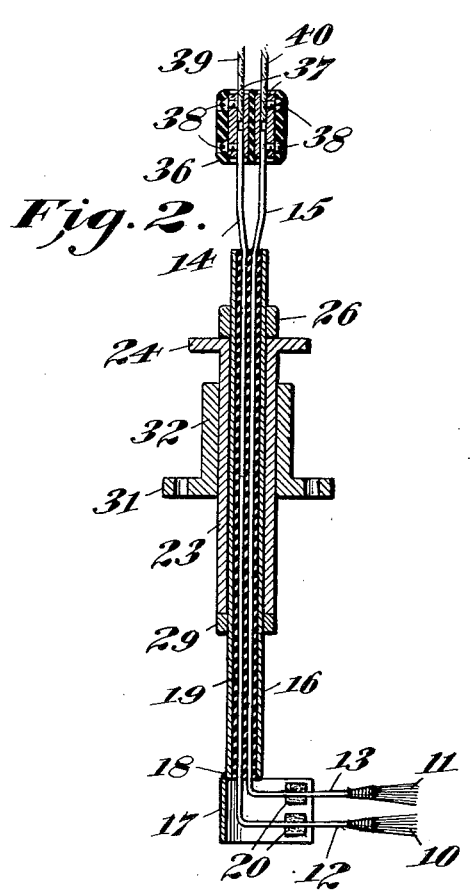
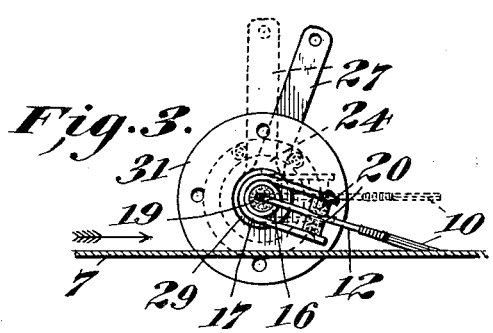
Inventor
Henry W. Nieman.
By R. S. A. Dougherty.
Attorney Nov. 16, 1954            H. W. NIEMAN            2,694,313
BRUSH THERMOCOUPLE TEMPERATURE MEASURING APPARATUS
Filed Sept. 2, 1950            2 Sheets-Sheet 2
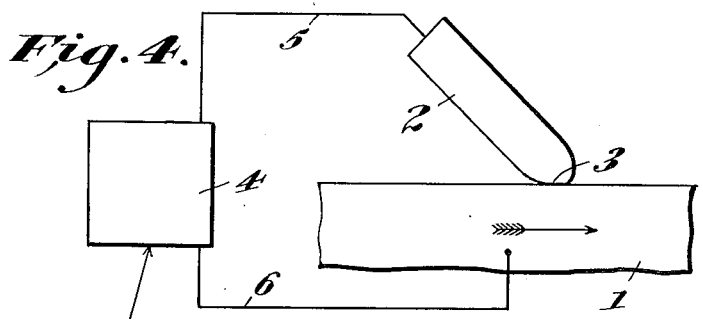
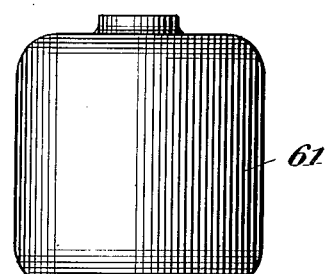
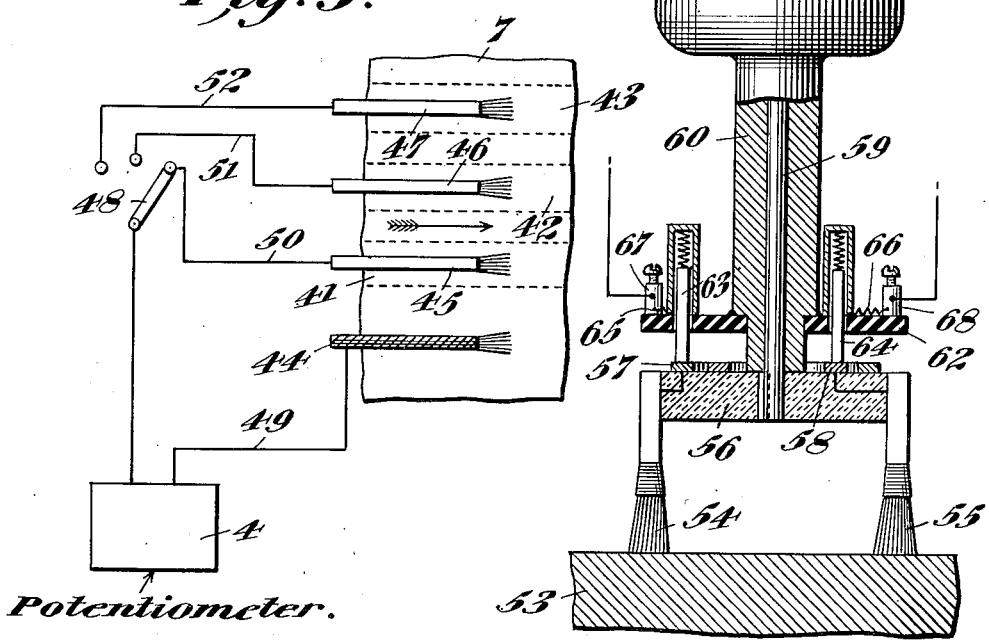
Inventor
Henry W. Nieman.
By R. S. A. Dougherty.
Attorney

United States Patent Office 2,694,313
Patented Nov. 16, 1954

2,694,313

BRUSH THERMOCOUPLE TEMPERATURE MEASURING APPARATUS

Henry William Nieman, Bethlehem, Pa., assignor to Bethlehem Steel Company, a corporation of Pennsylvania Application September 2, 1950, Serial No. 183,058

11 Claims. (Cl. 73—351)

My invention relates in general to improvements in pyrometers, and more particularly to a method and apparatus for thermo-electrically measuring the surface temperatures of bodies in motion with respect to such pyrometers, being especially useful for the measurement of the temperatures of metal strips and bars, roll surfaces, and the like.

Hitherto many efforts have been made to make such temperature measurements utilizing conventional thermocouples, the tip of the thermocouple contacting the surface whose temperature is to be measured. The difficulty in such an arrangement, as is well known, is that the temperature indicated is the temperature of the point of separation of the two dissimilar metals composing the thermocouple and not that of the junction as a whole and certainly not that of the portion of the junction which is in contact with the surface whose temperature is to be measured. The ordinary situation is that the temperature of the lead-in wires is not the same temperature as the surface temperature of the body to be measured and the temperature indicated by this point of separation will be some compromise between these differing temperatures. To avoid this difficulty many attempts have been made to make the temperature of the lead-in wires in the local vicinity of the junction the same as the temperature of the surface to be measured, utilizing shields, artificial heating means, etc.

In the present invention these difficulties are avoided by making the point of separation of the dissimilar elements composing the thermocouple, the actual surface itself. To simplify the discussion we will assume that the surface whose temperature is to be measured is contacted by two dissimilar wires; the one wire being of the same composition as the surface and will thus not exhibit any thermoelectric potential, the other wire of dissimilar composition contacts the surface a short distance away and the area in contact between this wire and the surface being the point of separation of dissimilar metals will produce a thermoelectric potential and it is at this area of contact that the temperature measurement is made. If this wire and the surface are stationary the temperature indicated will be some compromise between the true surface temperature and the temperature of the metal wire, which condition would not be substantially different from the present state of the art. However, let us now set the surface whose temperature is to be measured in motion relative to the wire and an entirely new situation develops. The area of contact of the wire is continuously being presented with fresh surface areas and only an infinitesimal thickness of the tip of the dissimilar metal wire need be at the surface temperature to indicate true surface temperature. Since discontinuity of temperature gradient is impossible, the temperature of an infinitesimal layer of each of the bodies at the area of contact must be equal. If we assume when contact is first made that this temperature is the average of the two bodies, then when an instant later a new area of the surface to be measured is presented, a new average will be struck between the previous average and the temperature of the surface to be measured. After this has been repeated a number of times, it is obvious that the common temperature of the area will approach the exact temperature of the moving surface, provided that the surface has a uniform temperature for a sufficient area to obtain a measurement. If we assume for example that the contact area is 1/100 inch diameter, with a movement of one inch one hundred new surfaces will be presented and the temperature of the area will be practically that of the moving surface, providing this is done with sufficient rapidity conduction does not influence the result. In practical cases, a moving strip for example, the motion is so rapid that this factor has no influence, and the temperature of the area almost instantly becomes that of the surface. Thus with this arrangement we not only secure a point of separation which is exactly at the temperature we wish to measure, but this condition is reached in such a short interval that the thermocouple may be said to read the desired temperature instantly. This is of course a characteristic entirely different from the ordinary thermocouple where the time lag is lengthy. It might be supposed that since friction exists between the wire and the surface, a rise in temperature might occur and a false reading result. It has been demonstrated in practice that wide ranges of contact pressure produce no measurable effect. The limit in this respect is a pressure so great as to scour and gouge the surface. Why friction has little or no effect can be seen from the reasoning given above. It is not possible to heat the contact end of the wire by friction since this is continuously being kept at the temperature of the moving surface. For this reasoning to be valid it is necessary for the contact area to be short in the direction of travel of the surface. If it were long and the friction considerable the strip surface would heat so that its temperature at the entering end would be lower than that further along and possible error result.

In the preferred form of the invention the thermocouple elements take the form of resilient wire or strip brushes (under pressure just sufficient to give good electrical contact). It is also preferred that the strip or other surface of which the temperature is being measured has a continuous reasonably rapid motion.

In a practical application both elements of the thermocouple which contact the surface whose temperature is to be measured will differ in composition from that of the surface and the above reasoning applies so long as the surface temperature is the same at the two points of contact. A third element at constant temperature can be interposed between the two elements of a thermocouple without changing the thermoelectric potential generated between the two elements of the thermocouple. In the situation where considerable difference in temperature exists across the surface of the body whose temperature is to be measured, it is preferred to have one of the wire elements composing the thermocouple of the same composition as the surface.

Since the temperature of the thermocouple wires has no influence on the surface temperature measurement it is equally feasible to measure the surface temperature of a body which is being heated or cooled, at high or low temperature levels. Measurements can also be made on submerged surfaces, oil or water producing no appreciable effect.

In the drawings:

Fig. 1 is a top plan view of a preferred form of my invention for measuring the temperature of moving sheet or strip in a permanent installation;

Fig. 2 is a horizontal section of the device shown in Fig. 1;

Fig. 3 is an end elevation of the device of Figs. 1 and 2;

Fig. 4 is a diagrammatic sketch illustrating the basic principle of my invention;

Fig. 5 is a diagram showing a method of rapidly measuring temperatures in several different locations; and Fig. 6 is a side elevation, partly in section, of a portable device which is particularly useful for measuring temperatures of stationary bodies.

The general principle of the invention may perhaps be best understood by considering initially the diagrammatic sketch of Fig. 4, in which the reference numeral 1 designates a moving hot body, the surface temperature of which is to be measured, and 2 is a second body which contacts said hot body 1 on the small area 3. Said bodies 1 and 2 are required to be of suitably different metals so that a thermo-electric potential will exist between them, which is measurable by the potentiometer 4 or equivalent device connected to the two bodies by lead wires 5 and 6. The small contact area 3 continuously contacts new surface portions of hot body 1, which portions are all at the temperature it is desired to measure, and the contact area 3 will therefore acquire this temperature. At even a very short distance from the surface inside body 2 the temperature will be different since there is continual heat flow through said body, but since the thermo-electric potential is generated at the exact point of contact, which is the junction of the dissimilar metals, this causes no error.

Figs. 1, 2 and 3 represent a suitable form of device for practical use with moving steel strip or the like, in which the strip 7 is shown as moving in the direction of the arrow and parallel to the long axis of the refractory wall 8 and metal shell 9 of the furnace wherein it is being heated. The contact elements comprise the brushes 10 and 11, composed of fine wires of iron and constantan or other dissimilar metals, and preferably secured by wrapping and brazing or the like to the angularly bent end portions 12 and 13 of the lead wires 14 and 15. Said lead wires are protected against physical damage by means of an enclosing pipe 16 and a U-shaped end hood 17 welded at 18 to said pipe 16, and are electrically and thermally insulated therefrom by means of the double hole insulator 19 and pairs of insulating blocks 20, held in position by the set-screws 21 and 22. The pipe 16 is rotatably journaled in a larger pipe 23 having an outer flange 24 which is provided with projecting spaced stop pins 25. A collar 26 having a lever arm 27 movable between the stop pins 25 is fastened by a set screw 28 on the inner pipe 16 above the flange 24, and at the other end of the pipe 23 an ordinary collar 29 is secured on said pipe 16 by a set-screw 30. The purpose of the lever arm 27 is to permit the brushes 10 and 11 to make or terminate contact with the strip whenever desired. A large flange 31 provided with a tubular body portion 32 is secured to the pipe 23 by a set-screw 33, and permits the device to be mounted upon the furnace shell 9 by means of the large bolts 34 and nuts 35. An insulated connector 36 having wire-receiving metal tube inserts 37 and set-screws 38, or other suitable connecting device, will permit the lead wires 14 and 15 to be connected by extension wires 39 and 40 to the potentiometer 4.

Fig. 5 shows a modification of the above device for measuring temperatures at a number of different locations, as in the case where the moving strip 7 may have a plurality of temperature zones 41, 42 and 43. In this case, a plurality of thermocouple elements corresponding to the requisite number of zones plus one, will be required, as shown in Fig. 5, in which the contact brush 44 of similar composition to the surface cooperates with brushes 45, 46 or 47 of dissimilar composition according to the position of tap switch 48 connecting by wires 49, 50, 51 and 52 to the potentiometer 4.

While I have spoken of the brush elements being stationary and the surface whose temperature is to be measured being a moving surface, it is obvious that the inverse is also a workable arrangement—the surface being stationary and brush elements being movable. This can be done simply by stroking the brush elements over the surface or in a preferred portable form shown in Fig. 6. Here the numeral 53 designates a stationary hot body, and 54 and 55 are brush type thermocouple elements attached to rotatable insulating block 56 and electrically connected to concentric slip rings 57 and 58 mounted on the upper surface of the block 56. Said block 56 is secured to a shaft 59 journaled in handle member 60 and adapted to be rotated by a motor 61 mounted on the handle member 60. A second insulating block 62 mounted on handle member 60 holds spring-pressed brushes 63 and 64 or like members in sliding contact with the slip rings 57 and 58. Said brushes 63 and 64 are electrically connected by wires 65 and 66 to binding posts 67 and 68. Between said binding posts the thermocouple electromotive force is measured. The rotation of the brush elements 54 and 55 over the surface has the same effect as moving the body under the thermocouple.

By the term "brush" as used herein I refer to a structure in which there are a multiplicity of individually flexible elastic elements each adapted to form a small contact area with the surface of which the temperature is to be measured.

Although I have thus described my invention in considerable detail, I do not wish to be limited narrowly to the exact and specific particulars disclosed above, but I may also use such substitutions, modifications or equivalents as are included within the scope and spirit of the invention or pointed out in the appended claims.

I claim:

1. A device for measuring the temperature of a surface in a state of relative motion with respect thereto, comprising a thermo-electric element which is a wire brush comprised of a bundle of wire filaments, the free ends of the filaments being adapted to slidably contact the surface whose temperature is to be measured so that a plurality of thermo-junctions of small area are formed at the points of contact, said wire filaments having a different thermo-electric potential than the surface, and leads electrically connecting the element and surface to an instrument responsive to thermo-electric force generated between said surface and said element when in contact.

2. A device for measuring the temperature of a metal surface in a state of relative motion with respect thereto, comprising a thermo-electric couple in which a wire brush comprised of a bundle of wire filaments forms one element, and the other element is a wire brush also comprised of a bundle of wire filaments, said latter filaments having a different thermo-electric potential than the surface, the ends of the wire filaments of both said brushes being adapted to slidably contact said surface, the contacting ends of the filaments of the second-mentioned brush forming a plurality of thermojunctions of small area at the points of contact, and leads electrically connecting the brushes to an instrument responsive to thermo-electric force generated at said thermojunctions.

3. A device for measuring the temperature of a moving surface, comprising a pair of brushes, each comprised of a bundle of wire filaments, one end of said filaments adapted to be brought into sliding contact with the surface whose temperature is to be measured, the filaments of one of said brushes being of dissimilar thermo-electric potential relative to the surface and forming a plurality of thermojunctions of small area at their points of contact therewith, lead wires connected to said brushes, means for supporting said lead wires and brushes in insulated spaced relation, and means for moving the brushes into or out of contact with the surface.

4. A device for measuring the temperature of moving metal strip, comprising a flanged tubular member mounted adjacent the strip, a second flanged tubular member bearing stops and secured within the first tubular member, an inner tubular member rotatably journaled within the second member and projecting over the strip, a lever arm secured to the inner tubular member and movable between the stops, a double hole insulator within the inner tubular member, lead wires within said insulator and having angularly bent parallel end portions, a U-shaped end hood partially enclosing said bent end portions of the lead wires and secured to the inner tubular member, and wire brushes terminating said lead wire end portions and adapted to contact the metal strip, one brush being of dissimilar thermo-electric properties relative to said metal strip.

5. A device for measuring the temperature of a metal surface, comprising an insulating block serving as a brush holder, wire brushes each comprising a bundle of metal filaments mounted on said brush holder, the metal of one of said brushes being dissimilar from the metal of the surface, means for rapidly rotating the brush holder and thereby traversing the brushes over said surface, and means for connecting the brushes to an external current indicating device.

6. A device for measuring the temperature of a substantially stationary surface, comprising a tubular member serving as a handle, a shaft extending centrally through said handle, a motor attached to one end of the shaft and mounted on the handle, an insulating block attached to the other end of the shaft, a pair of surface contacting elements comprised of bundles of wire filaments of dissimilar thermo-electric potentials mounted on said insulating block, slip rings individually connected to said elements and concentrically mounted on the insulating block, a terminal block mounted on the handle, brushes carried thereby and engaging the slip rings, and a thermo-electric potential indicating device connected to said brushes.

7. In an apparatus for measuring the temperature of an electrically conducting surface, a contacting member comprising a bundle of filaments of material thermo-electrically different from that of said surface, pressing means for urging the free ends of said filaments against said surface so as to establish a plurality of small areas of thermo-electric contact between said surface and said member, means for determining the thermo-electric potential between said surface and said free ends, and means for causing relative motion between said surface and said member so as to bring successive fresh portions of said surface into contact with the free ends of said member at such a rate that the temperature of said free ends shall be substantially that of said fresh portions.

8. In an apparatus for measuring the temperature of an electrically conducting surface, a pair of contacting members comprised of bundles of filamentary materials thermo-electrically different from each other and electrically insulated from each other except through said surface, pressing means for urging free ends of said contacting members against said surface so as to establish a plurality of small areas of thermal and electrical contact between said surface and the free ends of each of said members, means for determining the thermo-electric potential between said members, and means for causing relative motion between said surface and said members so as to bring successive fresh portions of said surface into contact with the free ends of said members at such a rate that the temperature of said areas shall be substantially that of said fresh portions.

9. In an apparatus for measuring the temperature of an electrically conducting surface, a contacting member comprising a plurality of elements of filamentary material thermoelectrically different from that of said surface, pressing means acting individually on the free ends of each of said elements for urging said elements lightly against said surface so as to establish small areas of thermal and electrical contact between said surface and said elements, means for determining the thermo-electric potential between said surface and said member, and means for causing relative motion between said surface and said elements so as to bring successive fresh portions of said surface into contact with the free ends of said elements at such a rate that the temperature of said free ends shall be substantially that of said fresh portions.

10. In an apparatus for measuring the temperature of an electrically conducting surface, a pair of contacting members each comprising a bundle of filamentary wire elements, the elements of one member being of material thermo-electrically different from the elements of the other member, said members being electrically insulated from each other except through said surface, pressing means acting individually on the free ends of each of said elements for urging said ends of said contacting members against said surface so as to establish small areas of thermal and electrical contact between said surface and said elements, means for determining the thermo-electric potential between said members, and means for causing relative motion between said surface and said elements so as to bring successive fresh portions of said surface into contact with the free ends of said elements at such a rate that the temperature of said small areas shall be substantially that of said fresh portions.

11. A device for measuring the temperature of a surface in a state of relative motion with respect thereto, comprising a pair of wire brushes, each comprised of a plurality of wire filaments, the free ends of said filaments being adapted to slidably contact the surface whose temperature is to be measured so that a plurality of junctions of small area are formed at the points of contact, the filaments of one of said brushes having a different thermo-electric potential than the filaments of the other brush, and current responsive temperature indicating means electrically connected to said brushes.

References Cited in the file of this patent

UNITED STATES PATENTS

| Number | Name | Date |
|---|---|---|
| 434,587 | Edison | Aug. 19, 1890 |
| 1,046,925 | Wilson | Dec. 10, 1912 |
| 1,140,701 | Mitchell | May 25, 1915 |
| 2,007,118 | Bosomworth | July 2, 1935 |
| 2,207,647 | Whipple | July 9, 1940 |
| 2,279,043 | Harrington | Apr. 7, 1942 |
| 2,450,871 | Adair | Oct. 12, 1948 |

FOREIGN PATENTS

| Number | Country | Date |
|---|---|---|
| 585,547 | Germany | Oct. 5, 1933 |